US005737692A

United States Patent [19]

Lang

[11] Patent Number: 5,737,692

[45] Date of Patent: Apr. 7, 1998

[54] CLOCK RADIO SYSTEM WITH REMOTE ALERT DEVICE

[75] Inventor: Michael Lang, Reston, Va.

[73] Assignees: Sony Corporation, Tokyo, Japan; Sony Electronics Inc., Park Ridge, N.J.

[21] Appl. No.: 720,336

[22] Filed: Sep. 27, 1996

[51] Int. Cl.[6] .................................................. H04B 7/00

[52] U.S. Cl. ........................ 455/66; 340/407.1; 340/539; 368/250

[58] Field of Search .............................. 455/66; 340/539, 340/309.15, 407.1; 368/244, 250, 251; 381/187

[56] References Cited

U.S. PATENT DOCUMENTS

| | | | |
|---|---|---|---|
| 2,517,368 | 8/1950 | Wiseley | 368/250 X |
| 3,786,628 | 1/1974 | Fossard et al. | 368/250 X |
| 4,093,944 | 6/1978 | Muncheryan | 340/539 X |
| 4,821,247 | 4/1989 | Grooms | 368/63 |
| 4,853,674 | 8/1989 | Kiss | 340/407.1 |
| 4,920,525 | 4/1990 | Meister | 368/250 |
| 5,168,476 | 12/1992 | Ganter et al. | 368/250 X |

*Primary Examiner*—Thomas Mullen
*Attorney, Agent, or Firm*—Lise A. Rode, Esq.; Jerry A. Miller

[57] ABSTRACT

A system and method for providing a remote alert from a clock radio to a user at a predetermined time without disturbing others around him. The clock radio is preferably a superheterodyne receiver and includes an alert signal circuit for providing radio frequency alert signals at a predetermined alarm time and a radio frequency transceiver for receiving broadcast radio frequency signals and for transmitting radio frequency signals including the broadcast radio frequency signals and the radio frequency alert signals. A timing circuit in the clock radio includes a coincidence detecting circuit which detects the coincidence between the time of day and the predetermined alarm time, and causes the alert signal circuit to provide an alert signal to the radio frequency transceiver for transmission to a selected wireless remote alert device at the predetermined time. The selected wireless remote alert device receives radio frequency signals at the predetermined time, including the radio frequency alert signals, and processes such received radio frequency signals in a manner similar to the superheterodyning technique. The thus processed signal will then be provided to a transducer in the wireless remote alert device, which will in turn produce a tone or a small vibration, or reproduce the broadcast AM or FM signal. The wireless remote alert device is preferably inserted in the user's ear, awakening only the user.

9 Claims, 2 Drawing Sheets

CLOCK RADIO SYSTEM WITH REMOTE ALERT DEVICE

BACKGROUND OF THE INVENTION

1. Field of the Invention

This invention relates to radio frequency transceivers. More particularly, it relates to a wireless remote device which receives radio frequency signals from a clock radio, and which may be worn or carried by a user to alert the user at a predetermined time without disturbing others.

2. General Background

Radio frequency receivers having clock functions, or clock radios, are commonly found in most households today. As known in the art, in operation, the user of the clock radio actuates one or more of several actuators disposed on the clock radio body to alternately operate the radio receiver and clock functions. When the user desires to place the clock in an alarm mode, such as to wake up at a predetermined time, he actuates the appropriate actuators to set the alarm time and to place the alarm in the "armed" state. When the actual time is reached, a device such as a buzzer, bell, or other transducer, is actuated to emit a sound which will notify, or wake, the user. Alternatively, as also known in the art, the clock radio may be made to emit an AM or FM broadcast signal as the alarm.

However, it has been found that often times, more than one user will require use of the alarm function, and such users may desire that the alarm be set for different times; so as to be wakened, for example, at different times. Until recently, some compromise alarm set time had to be met to satisfy both users. For example, if one person desired to be wakened by the clock radio alarm at "6:00 A.M." and the other at "7:00 A.M.", a compromise of perhaps "6:30 A.M." had to be reached. This was generally undesirable to both users. To alleviate this problem, certain clock radios were introduced which had two separate alarm-setting mechanisms, and which therefore allowed the users to have two separate alarm times. Some clock radios are even provided separate tuners in order that each user could waken at different times to a different broadcast station. The problem with such aforementioned clock radios is that, even though separate alarm times may be set, the alarm is generally loud enough that both users will often be wakened by the first alarm, thus frustrating the intended purpose of having separate alarms.

It would therefore be desirable to provide a system and method for providing separate alerts or alarms to wake or otherwise notify two or more users at different predetermined times, wherein each of such alerts would be provided to the targeted user without disturbing the other user(s).

SUMMARY OF THE INVENTION

Accordingly, it is one object of the present invention to provide a system and method for alerting a user at a predetermined time.

It is another object of the invention to provide a clock radio which can remotely alert a user at a predetermined time.

It is still another object of the present invention to provide a clock radio which can remotely alert a user at a predetermined alarm time using radio frequency signals.

Yet another object of the present invention is to provide a wireless remote device which can receive radio frequency signals from a clock radio, and which may be worn or carried by a user to alert the user at a predetermined time without disturbing others around him.

These and other objects, advantages and features of the invention will become apparent to those skilled in the art upon consideration of the following description of the invention.

According to one aspect of the present invention, a radio frequency signal is provided from a clock radio to a selected wireless remote alert device in order to alert a user at a predetermined time, by determining in the clock radio the predetermined time, producing an alert signal in the clock radio at the predetermined time, transmitting the radio frequency signal from the clock radio to the wireless remote alert device at the predetermined time in response to the alert signal, receiving the radio frequency signal in the wireless remote alert device at the predetermined time, and, then activating a transducer in the selected wireless remote alert device in response to the received radio frequency signal.

According to another aspect of the present invention, there is provided a system for remotely alerting a plurality of users of a predetermined time, such system including a clock radio unit and a wireless remote alert device. The clock radio unit includes: an alert signal circuit for providing radio frequency alert signals at a predetermined time; a radio frequency transceiver for receiving broadcast radio frequency signals and for transmitting radio frequency signals including the broadcast radio frequency signals and the radio frequency alert signals; a radio frequency amplifier for selecting and amplifying one of the received broadcast radio frequency signals to provide an amplified broadcast radio frequency signal; ,a mixing circuit to translate the frequency of the amplified broadcast radio frequency signal to an intermediate frequency signal; an intermediate frequency amplifier for selecting and amplifying the intermediate frequency signal; a demodulator for demodulating the intermediate frequency signal to provide an audio frequency signal; and an audio frequency amplifier for amplifying the audio frequency signals, and a first transducer to convert the amplified audio frequency signals into sound. The clock radio unit further includes a timing unit for determining the predetermined time, such timing unit including: a timing circuit for providing the time of day; a time setting circuit for setting an alert function to a predetermined time; and, a coincidence detecting circuit for detecting the coincidence between the time of day provided by the timing circuit and the predetermined time provided by the time setting circuit, and for causing the alert signal circuit to provide the radio frequency alert signals to the radio frequency transceiver at the predetermined time. The wireless remote alert device includes an antenna for receiving the radio frequency signals including the radio frequency alert signals at the predetermined time, a radio frequency selectivity circuit for selecting one of the radio frequency signals, an intermediate frequency circuit for receiving the selected one of the radio frequency signals and for providing an intermediate frequency output signal, an intermediate frequency filter for filtering the intermediate frequency output signal, an intermediate frequency amplifier for amplifying the filtered intermediate frequency output signal, a discriminator for receiving the intermediate frequency output signal and for providing an audio frequency signal, an audio amplifier for amplifying the audio frequency signal, and, a second transducer for reproducing the audio frequency signal as sound.

In accordance with yet another aspect of the invention, while the wireless remote alert device is preferably similar in design to an earplug and may be inserted in the user's ear, it may be any device that can be worn or carried such as a bracelet.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

DETAILED DESCRIPTION OF THE PREFERRED EMBODIMENT

Figure 1:
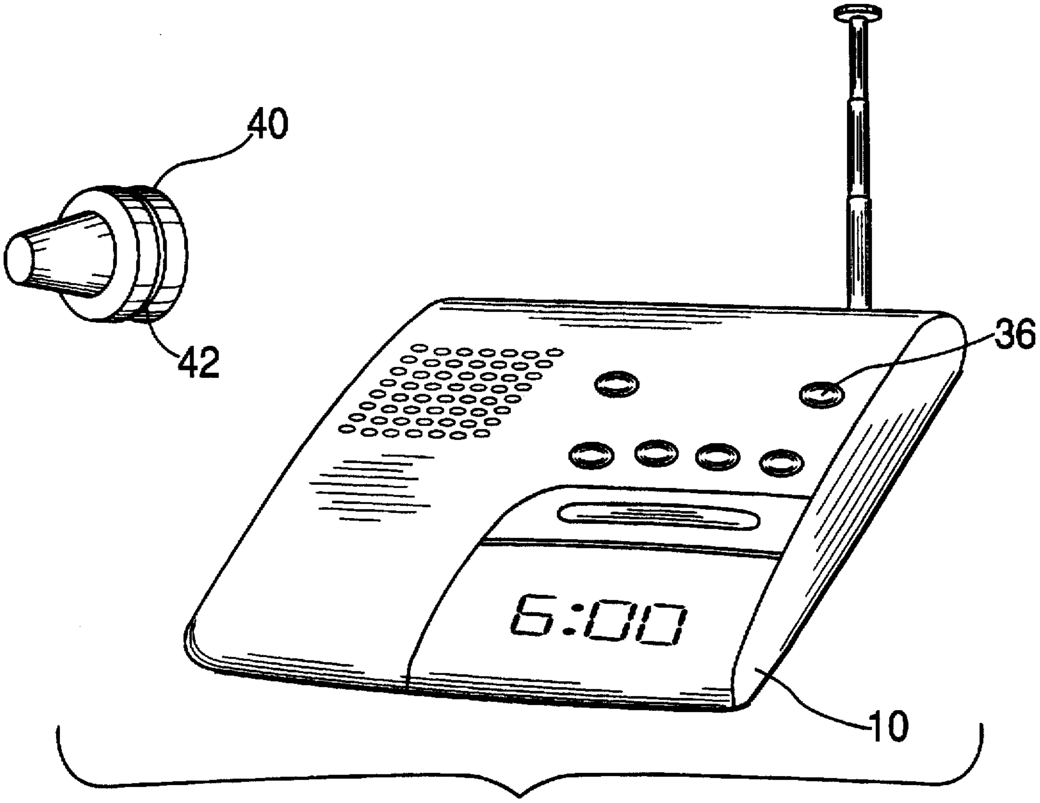
FIG. 1 shows a block diagram of a first embodiment of the clock radio alert system of the present invention.

One embodiment of alert system of the present invention will be described with reference to FIG. 1. As seen therein, the alert system includes a radio frequency transceiving device 10 and a wireless remote device 40 which receives radio frequency signals from the radio frequency device 10. The radio frequency transceiver device 10 is combined with electronic clock circuitry 33, so that the radio frequency transceiver device 10 is a clock radio. In the embodiment of FIG. 1, the wireless remote device 40 is a device similar to an earplug, which may be inserted in the user's ear; however, the wireless remote device 40 may take a different form such as a bracelet that the user may wear around his wrist.

Figure 2A:
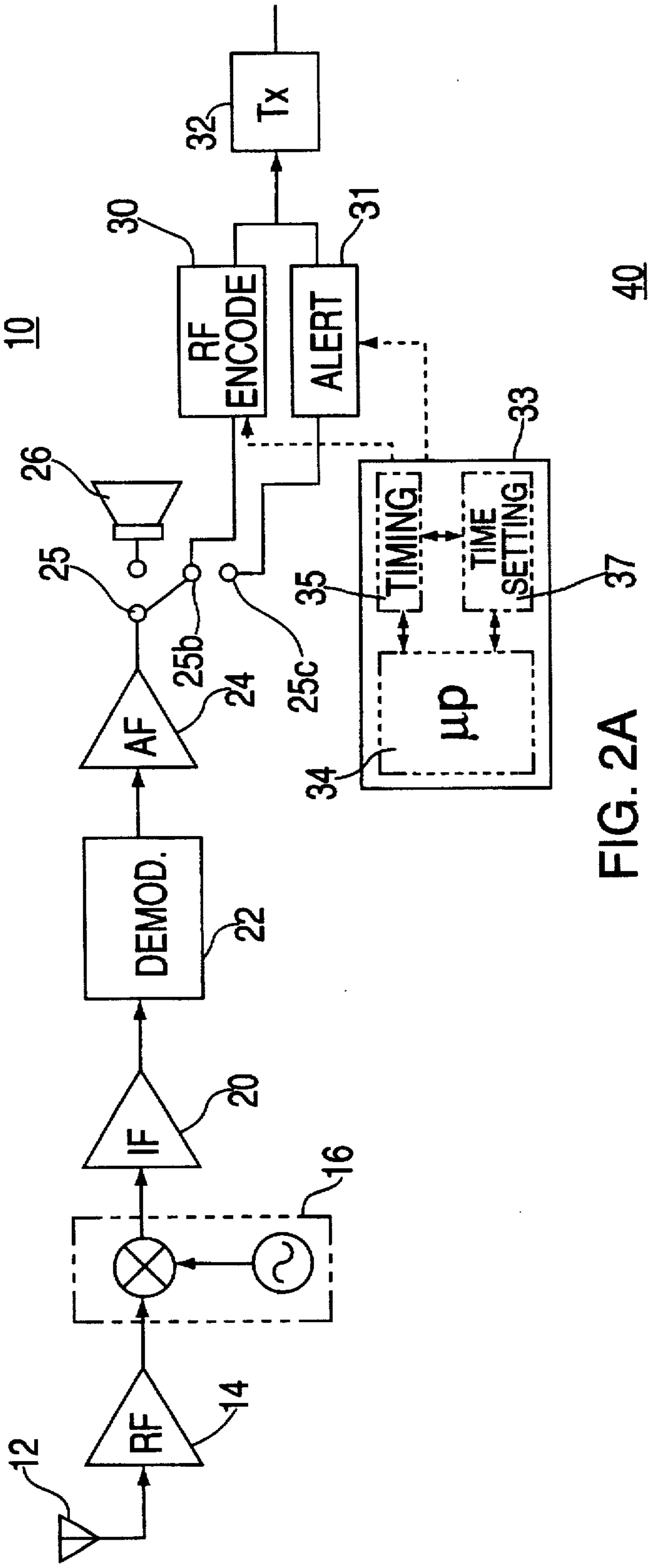
FIG. 2 shows a more detailed block diagram of the first embodiment of the clock radio alert system of the present invention.
Figure 2B:
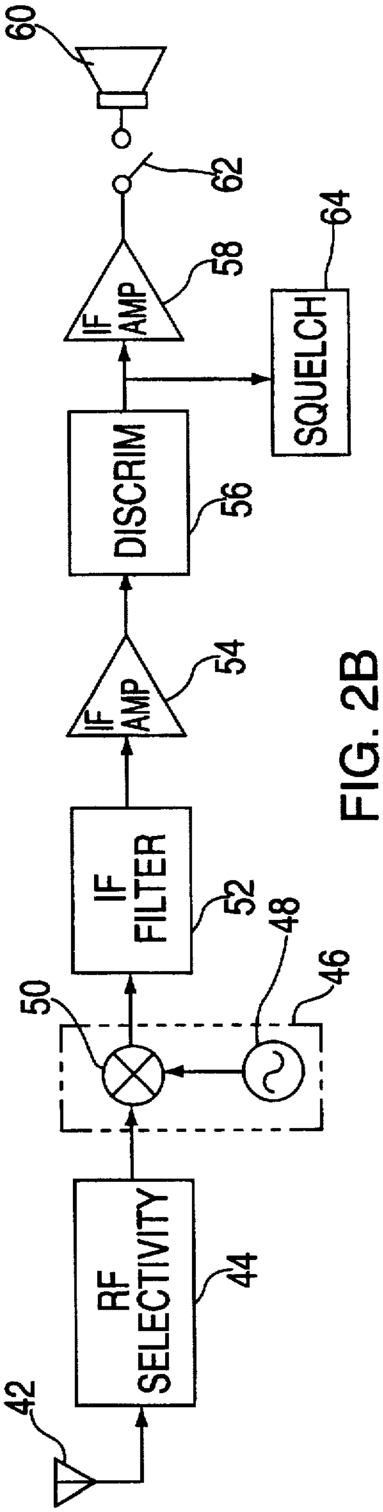

The alert system of the present invention may be seen in more detail in FIG. 2. The clock radio device 10 of the present invention may include a simple radio receiver, having only an RF amplifier (including tuned circuit), demodulator, audio frequency (AF) amplifier, AF power amplifier, and an electroacoustic transducer (e.g., loudspeaker) to reproduce the received signals as sound. However, preferably, the clock radio device 10 includes a superheterodyne radio frequency receive, as is most commonly used today. As seen in FIG. 2, such superheterodyne radio frequency receiver includes at least an antenna 12, a radio frequency (RF) amplifier 14, a mixing circuit 16, an intermediate frequency (IF) amplifier 20, a demodulator 22, an audio frequency amplifier 24, and a loudspeaker 26. The clock radio device 10 also includes a RF encoding circuit 30, an alert signal circuit 31 which preferably includes an oscillator (not shown), and an RF transmitter 32 for transmitting RF signals to the wireless; remote alert device 40. (Although only an FM receiver is shown in FIG. 2, it will be understood that an AM receiver is also preferably included in the clock radio device 10, and that such AM receiver is not shown in FIG. 2 for the sake of simplicity. Furthermore, the standard operation of such AM receiver is well known in the art, and will not be discussed further here).

In addition, as stated above, the clock radio device 10 of the present invention also includes electronic clock circuitry 33. As known in the art, such electronic clock circuitry 33 includes at least a coincidence detecting circuit (including a microprocessor) 34, a timing circuit 35, which in turn includes a time reference source for providing a time reference signal (e.g., a quartz oscillator and associated circuitry (not shown) for providing a resonance frequency of 32,768 Hz), and a time setting circuit 37 for setting time via the actuators 36 (FIG. 1) for setting the time-of-day and alarm times. Operation of the standard time-of-day and alarm features of the clock radio device 10 of the present invention are well known in the art, and will not be discussed further here.

As also seen in FIG. 2, the wireless remote alert device 40 preferably operates using a technique similar to superheterodyning. The wireless remote alert device 40 preferably includes an antenna 42 for receiving the RF signals transmitted from the RF transmitter 32 of the clock radio device 10. The antenna 42 is preferably a metal strip or band disposed around the perimeter of the wireless remote alert device 40 (FIG. 1 ). The received RF signals are then provided to a RF selectivity or filtering circuit 44 for image-channel rejection. The circuit 44 may be a simple bandpass filter or similar such device as known in the art. The output from the RF selectivity circuit 44 is then provided to an intermediate frequency (IF) circuit 46, for adjacent channel selectivity. As known, the IF circuit 46 generally includes a local oscillator 48 which beats with the incoming frequency of a mixer 50 to provide the IF output response. The output from the IF circuit 46 is then provided to an IF filter 52, which may be a simple lowpass filter (LPF) preferably made of ceramic. The output from the IF filter is then preferably amplified in an IF amplifier 54, the amplified output of which is then provided to a discriminating or demodulating circuit 56 in order to remove the RF signal and detect the audio frequency signal from the IF signal. This detected signal is then provided to an amplifier 58 for amplifying the audio signal and for driving an alert transducer 60. As it is important that no extraneous RF signal or noise be received in the wireless remote alert device 40 except upon receipt of an alert signal from clock radio device 10, a squelch circuit 62 and associated switch 62 is included in the wireless remote alert device 40 in order to suppress the audio frequency signal when the strength of the incoming RF signal is below a predetermined level. If the RF signal strength exceeds such predetermined level, the squelch circuit 62 will open and switch 62 will close, so that the audio frequency signal will be provided from amplifier 58 to alert transducer 60. It is expected that the wireless remote alert device 40 and the clock radio device 10 will be in close transceiving range, and thus no amplification has been introduced between the antenna 42 and RF selectivity circuit 44, as might be seen in standard superheterodyne receivers. However, it will be appreciated that an RF amplifier may easily be introduced at that stage, and that the such variation is intended to be within the scope of the present invention.

Operation of the alert system of the present invention will now be described. With reference to FIGS. 1 and 2, in the first embodiment of the present invention, the user will actuate the actuators 36 to set the time by which he desires to wake; for example, "6:00 A.M. " and will actuate switch 25 so that the clock radio device 10 will either provide an alert signal from alert signal circuit 31 (**25*c*), or will reproduce a preselected AM/FM station via the RF encoding circuit (25*b*). Then the user will insert the wireless remote alert device 40 in his ear before going to sleep. If switch 25 is set to 25*c*, when the coincidence detecting circuit 34 in the clock radio device 10 determines that the alarm time is coincident with the actual time of day, the microprocessor 29 of the coincidence detecting circuit 34 will send a signal to the alert signal circuit 31, which will transmit a signal to the RF transmitter 32. In response to receiving the signal from the alert signal circuit 31, the RF transmitter 32 wilt then transmit a RF signal to the antenna 42 of the wireless remote alert device 40, where it will be processed using a technique similar to superheterodyning, as described above. If the strength of the incoming RF signal exceeds a predetermined level, the squelch circuit 62 will cause the switch 62 to close, and the output signal from AF amplifier 58 to be provided to the alert transducer 60. The alert transducer 60 will in turn produce a tone or a small vibration in the ear of the user. As the wireless remote alert device 40** is inserted in the user's ear, only the user will be awakened and no one else will be disturbed.

In the alternate embodiment discussed above, switch 25 can be set to **25*b* so that the RF transmitter 32 will transmit an AM/FM broadcast signal to the wireless remote alert device 40. In such an embodiment, when the coincidence detecting circuit 33 determines that the alarm time is coincident with the actual time of day, the microprocessor 29 therein will instead cause the previously selected AM/FM broadcast signal to be encoded in the RF encoding circuit 30, and then transmitted from transmitter 32 to the wireless remote alert device 40. When the thus transmitted AM/FM signal is received at the antenna 42 of the wireless remote alert device 40, such RF signal will processed in the manner discussed above. The alert transducer 60** will thus reproduce the AM or FM signal in the ear of the user.

It will be appreciated that more than one user may be alerted by the clock radio device 10, since, as mentioned above, alarm clocks having multiple alarm settings are known to currently exist. In the case of the clock radio device 10 which has such multiple alarm settings, the time setting circuit 37 may also be set to a second alarm time. A second user will again actuate the actuators 36 to set the second alarm time by which he desires to wake; for example, "7:00 A.M." Then the second user will insert a second, different wireless remote alert device in his ear before going to sleep. Such second device is similar in construct and operation to the wireless remote alert device 40 as shown in FIG. 2 (For simplicity purposes, such second wireless remote alert is not shown herein). When the coincidence detecting circuit 34 determines that the alarm time is coincident with the actual time of day, the coincidence detecting circuit will, again, either send a signal to the alert signal circuit 31 which will transmit a signal to the RF transmitter 32, will cause an AM or FM signal to be encoded in the RF encoding circuit 30 and then transmitted at RF transmitter 32. An alert transducer in the second wireless remote alert device will again either produce a tone or a small vibration, or reproduce the AM or FM signal in the ear of the second user. Thus, only the first user will be awakened by the transducer 60 of wireless remote alert device 40 in response to the first alarm, while only the second user will be awakened by the transducer of the second wireless remote alert device in response to the second alarm.

Although the wireless remote alert device 40 described above is preferably a device which may be inserted a user's ear, the invention is not so limited. For example, the wireless remote alert device 40 may be a wrist bracelet which can be worn by the user. In such embodiment, the transducer 60 would be a vibrating element which is activated by RF signals in order to ensure that only the intended user will be awakened. Operation of such vibrating elements in response to radio frequency signals is known in the art, and vibrating elements, such as piezoelectric elements, are readily available.

It is further apparent that in accordance with the present invention, an embodiment that fully satisfies the objectives, aims and advantages is set forth above. While the invention has been described in conjunction with specific embodiments, it is evident that many alternatives, modifications, permutations and variations will become apparent to those skilled in the art in light of the foregoing description. Other embodiments will occur to those skilled in the art. Accordingly, it is intended that the present invention embrace all such alternatives, modifications and variations as fall within the scope of the appended claims.

What is claimed is:

1. A method of providing a plurality of radio frequency signals from a clock radio to a plurality of Wireless remote alert devices in order to alert users at predetermined times, comprising the steps of:

determining in said clock radio a first predetermined time;

producing a first alert signal in said clock radio at said first predetermined time;

transmitting a first of said plurality of radio frequency signals from said clock radio to a first of said plurality of wireless remote alert devices at said first predetermined time in response to said first alert signal; and, receiving said first radio frequency signal in said first wireless remote alert device, wherein only said first of said plurality of wireless remote alert devices is activated.

2. The method of claim 1, further comprising the steps of:

determining in said clock radio a second predetermined time;

producing a second alert signal in said clock radio at said second predetermined time;

transmitting a second of said plurality of radio frequency signals from said clock radio to a second of said plurality of wireless remote alert devices at said second predetermined time in response to said second alert signal; and, receiving said second radio frequency signal in said second wireless remote alert device, wherein only said second of said plurality of wireless remote alert devices is activated.

3. A system for remotely alerting a user of a predetermined time, comprising: clock radio means, including:

an alert signal circuit for providing radio frequency alert signals at said predetermined time;

a radio frequency transceiver for receiving broadcast radio frequency signals and which is capable of transmitting radio frequency signals including said broadcast radio frequency signals and said radio frequency alert signals;

a radio frequency amplifier for selecting and amplifying one of said received broadcast radio frequency signals to provide an amplified broadcast radio frequency signal;

mixing means to translate the frequency of said amplified broadcast radio frequency signal to an intermediate frequency signal;

an intermediate frequency amplifier for selecting and amplifying said intermediate frequency signal;

a demodulator for demodulating said intermediate frequency signal to provide an audio frequency signal;

an audio frequency amplifier for amplifying said audio frequency signals;

a first transducer to convert said amplified audio frequency signals into sound;

timing means for determining said predetermined time and for causing said alert signal circuit to provide said radio frequency alert signals to said radio frequency transceiver at said predetermined time;

and, wireless remote alert device means including:

an antenna for receiving said radio frequency signals including said radio frequency alert signals at said predetermined time;

a radio frequency selectivity circuit for selecting one of said radio frequency signals;

an intermediate frequency circuit for receiving said selected one of said radio frequency signals and for providing an intermediate frequency output signal;

an intermediate frequency filter for filtering said intermediate frequency output signal;

an intermediate frequency amplifier for amplifying said filtered intermediate frequency output signal;

a discriminator for receiving said intermediate frequency output signal and for providing an audio frequency signal;

an audio amplifier for amplifying said audio frequency signal; and, a second transducer for reproducing said audio frequency signal as sound at said predetermined time.

4. The system of claim 3, further comprising:

a squelch circuit for comparing the strength of said received radio frequency signals with a predetermined threshold value; and, switch means for connecting said audio amplifier with said second transducer, wherein when the strength of said radio frequency signals exceeds said predetermined threshold value, said squelch circuit causes said switch means to connect said audio amplifier with said second transducer.

5. The system of claim 3, wherein said intermediate frequency circuit comprises a local oscillator for providing a local oscillating frequency, and a mixer for mixing said local oscillating frequency of said local oscillator with said selected one of said radio frequency signals.

6. The system of claim 3, wherein said radio frequency selectivity circuit comprises a bandpass filter.

7. The system of claim 3, wherein said intermediate filter comprises a lowpass filter.

8. A system for remotely alerting a plurality of users of a predetermined time, comprising: a clock radio unit, including:

an alert signal circuit for providing radio frequency alert signals at said predetermined time;

a radio frequency transceiver for receiving broadcast radio frequency signals and which is capable of transmitting radio frequency signals including said broadcast radio frequency signals and said radio frequency alert signals;

a first radio frequency amplifier for selecting and amplifying a first of said plurality of received broadcast radio frequency signals to provide a first amplified broadcast radio frequency signal;

a second radio frequency amplifier for selecting and amplifying a second of said plurality of received broadcast radio frequency signals to provide a second amplified broadcast radio frequency signal;

mixing means to translate the frequency of said first and second amplified broadcast radio frequency signals to first and second intermediate frequency modulated carrier frequency signals, respectively;

an intermediate frequency amplifier for selecting and amplifying said first and second intermediate frequency modulated carrier frequency signals, respectively;

a demodulator for demodulating said first and second intermediate frequency modulated carrier frequency signals to provide first and second audio frequency signals;

an audio frequency amplifier for amplifying said first and second audio frequency signals;

a first transducer to convert said amplified first and second audio frequency signals into sound;

timing means for determining said predetermined time and for causing said alert signal circuit to provide said radio frequency alert signals to said radio frequency transceiver at said first and second predetermined times;

and, a first wireless remote radio frequency receiver including:

a first radio frequency receiver means for receiving radio frequency signals transmitted by said radio frequency transceiver including said radio frequency alert signals when said timing means determines said first predetermined time;

first intermediate frequency circuit means for receiving and amplifying said radio frequency signals and for providing intermediate frequency signals;

a first discriminator for receiving said intermediate frequency output signal and for providing an audio frequency signal;

a first audio amplifier for amplifying said audio frequency signal;

a second transducer to convert said radio frequency signals into sound and to thereby alert said user at said first predetermined time.

9. The system of claim 8, further comprising:

a second wireless remote radio frequency receiver including:

second radio frequency receiver means for receiving radio frequency signals transmitted by said radio frequency transceiver including said radio frequency alert signals when said timing means determines said second predetermined time;

a second intermediate frequency circuit means for receiving and amplifying said radio frequency signals and for providing intermediate frequency signals;

a second discriminator for receiving said intermediate frequency output signal and for providing an audio frequency signal;

a second audio amplifier for amplifying said audio frequency signal;

a third transducer to convert said radio frequency signals into sound and to thereby alert said user at said second predetermined time.

* * * * *